United States Patent
Aoki

(10) Patent No.: US 12,372,783 B2
(45) Date of Patent: Jul. 29, 2025

(54) LAMINATED GLAZING FOR PROJECTING AN IMAGE FROM A HEAD-UP DISPLAY (HUD)

(71) Applicant: AGC GLASS EUROPE, Louvain-la-Neuve (BE)

(72) Inventor: Tokihiko Aoki, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 604 days.

(21) Appl. No.: 17/780,876

(22) PCT Filed: Nov. 25, 2020

(86) PCT No.: PCT/EP2020/083419
§ 371 (c)(1),
(2) Date: May 27, 2022

(87) PCT Pub. No.: WO2021/105241
PCT Pub. Date: Jun. 3, 2021

(65) Prior Publication Data
US 2023/0016592 A1     Jan. 19, 2023

(30) Foreign Application Priority Data
Nov. 29, 2019 (EP) .................................. 19212607

(51) Int. Cl.
*B32B 17/10* (2006.01)
*G02B 27/01* (2006.01)

(52) U.S. Cl.
CPC .... *G02B 27/0101* (2013.01); *B32B 17/10036* (2013.01); *B32B 17/10348* (2013.01);
(Continued)

(58) Field of Classification Search
None
See application file for complete search history.

(56) References Cited

U.S. PATENT DOCUMENTS 10,678,050 B2 *  6/2020  Kremers ........... B32B 17/10036
2019/0047261 A1  2/2019  Keller
(Continued)

FOREIGN PATENT DOCUMENTS

| WO | WO 2017/146901 A1 | 8/2017 |
| WO | WO 2019/020432 A1 | 1/2019 |
| WO | WO 2019/064279 A1 | 4/2019 |

OTHER PUBLICATIONS

International Search Report mailed on Feb. 15, 2021 in PCT/EP2020/083419 filed on Nov. 25, 2020 (3 pages).

*Primary Examiner* — Thanh Nhan P Nguyen
(74) *Attorney, Agent, or Firm* — Oblon, McClelland, Maier & Neustadt, L.L.P.

(57) ABSTRACT

A laminated glazing for a head-up display (HUD). The laminated glazing has an outer glass pane and an inner glass pane, which are bonded to one another via a thermoplastic intermediate layer. The intermediate layer in the vertical course (C) between a lower edge L and the upper U edge of the laminated glazing is variable at least in sections between two virtual points P1 and P2 taken along the vertical course (C). The calculated surface area (S) surrounded a straight line connecting a first value V1 defined by a position (d(1)) and a thickness (Tk(1)) of the virtual point P1 and the last value V2 defined by a position (d(2)) and a thickness (Tk(2)) of the virtual point P2 is above 10.000 mm×µm.

13 Claims, 2 Drawing Sheets

Figure 1:
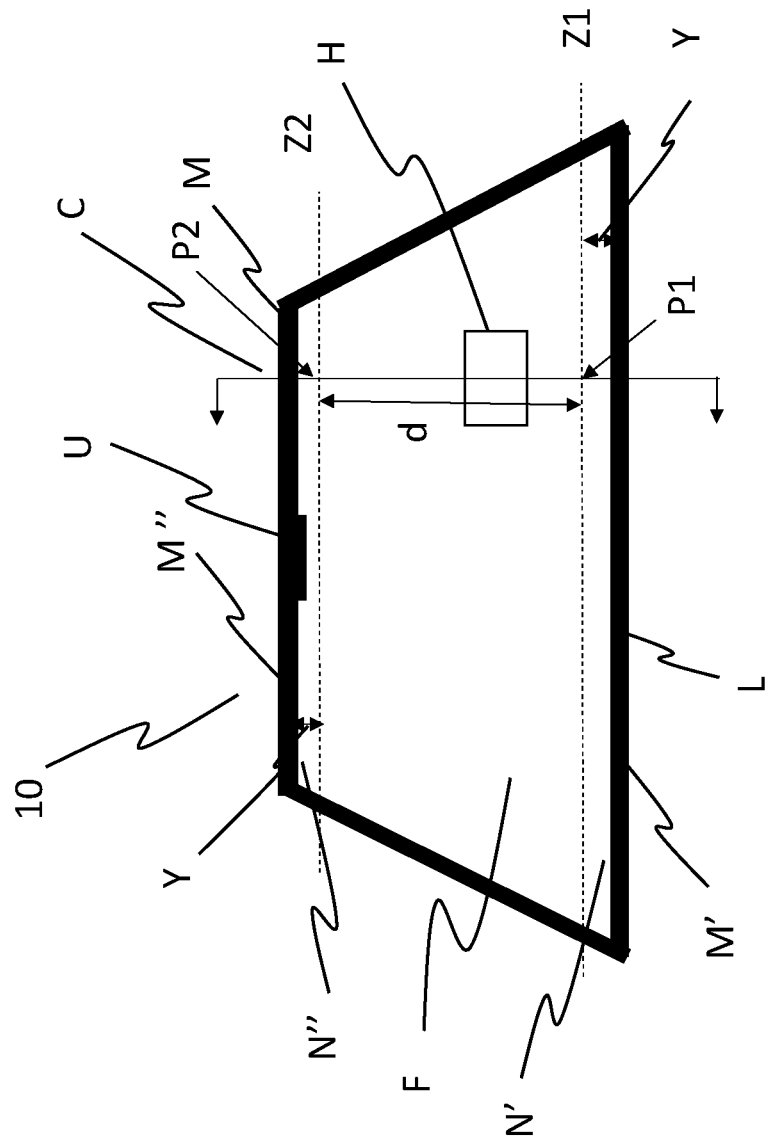

(52) U.S. Cl.
CPC .. *B32B 17/10568* (2013.01); *B32B 17/10761* (2013.01); *B32B 17/1077* (2013.01); *B32B 17/10788* (2013.01); *B32B 17/10899* (2013.01); *B32B 2307/102* (2013.01); *B32B 2307/732* (2013.01); *B32B 2457/20* (2013.01); *B32B 2605/006* (2013.01); *G02B 2027/0194* (2013.01)

(56) References Cited

U.S. PATENT DOCUMENTS

2020/0147934 A1 5/2020 Arndt et al.
2020/0254731 A1* 8/2020 Mannheim Astete ................ B32B 17/1077

* cited by examiner

LAMINATED GLAZING FOR PROJECTING AN IMAGE FROM A HEAD-UP DISPLAY (HUD)

FIELD OF THE INVENTION

The invention relates to a laminated glazing and a projection arrangement for a head-up display, a method for producing HUD (head up display) compatible windshields.

DESCRIPTION OF PRIOR ART

The invention relates to a laminated glazing and a projection arrangement for a head-up display, a method for producing the laminated glazing, and use thereof.

Modern automobiles are increasingly equipped with so called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the driver's field of vision, for example, the current driving speed, navigation or warning messages, which the driver can perceive without having to divert his glance from the road. Head-up displays can thus contribute significantly to an increase in traffic safety.

With the head-up displays described above, the problem arises that the projector image is reflected on both surfaces of the windshield. Thus, the driver perceives not only the desired primary image but also a slightly offset secondary image usually weaker in intensity. The latter is commonly referred to as a ghost image. This problem is commonly resolved in that the reflecting surfaces are arranged at a angle relative to one another deliberately selected such that the primary image and the ghost image coincide, as a result of which the ghost image is no longer distractingly noticeable. In prior art laminated glazings for head-up displays, the wedge angle is, typically roughly 0.5 mrad.

Windshields comprise two glass panes that are laminated to one another via a thermoplastic intermediate interlayer. If the surfaces of the glass panes are to be arranged, as described, at an angle, it is customary to use a thermoplastic interlayer with a non-constant thickness. This is also referred to as a wedge-shaped interlayer or a wedge interlayer. The angle between the two surfaces of the interlayer is referred to as a wedge angle. The wedge angle can be constant over the entire interlayer (linear change in thickness) or can change depending on position (nonlinear change in thickness). Laminated glasses with wedge interlayers are known, for example, from WO2009/071135A1, EP1800855B1, or EP1880243A2.

Wedge interlayers are typically produced by extrusion, wherein a wedge-shaped extrusion die is used. The production of a wedge interlayer with a desired wedge angle, which depends, among other things, on the concrete pane geometry and the projection arrangement of the head up display, is very expensive and complex.

However, generally the wedge-shaped interlayer and more particularly the PVB (polyvinyl butyral) pane is obtained by stretching the interlayer. Then the stretched interlayer presents a non-linear thickness profile compared to the profile that is created by connecting directly the thickest and thinnest point. The interlayer is then thinner in the centre area of the windshield when the interlayer is laminated between at least two glass panes.

However, when a non-linear wedge-shape interlayer is laminated between at least two glass panes, the de-airing process during the lamination process usually used in automotive field is insufficient leading to presence of bubbles inside the laminated glazing. This problem is more present when the interlayer is composed by multiple layers of interlayer such as multiple interlayers used in windshield having a wedge PVB with acoustic functionalities to limit the ghost images and to enhance acoustic performance with the presence of soft, so-called core layer as well.

Root cause of this defect is the residual air in the centre area of the windshield, where the intermediate layer have a concave shape.

More the intermediate interlayer has a concave shape more bubbling occurs in the windshield.

Thus, there is a need for an improved laminated glazing for a head-up display (HUD) wherein ghost images of the HUD projection occur to a lesser extent.

Another other of the present invention is to provide a method to manufacture an improved laminated glazing for a head-up display (HUD) with an increased yield since the formation of bubbles during the lamination process are avoided or decreased.

SUMMARY OF THE INVENTION

The object of the invention is to provide an improved laminated glass for a head-up display that is more efficient, economical and simpler to produce than prior art laminated glasses of this type.

The object of the present invention is accomplished according to the invention by a laminated glass according to claim 1. Preferred embodiments emerge from the sub-claims.

To this end, the present application provides a laminated glazing for a head-up display (HUD) at least comprising:
  an outer pane and an inner pane, which are bonded to one another via a thermoplastic intermediate layer,
  the glazing having an upper edge and a lower edge,
  a HUD region wherein a virtual image is generated by an HUD-projector,
  wherein the windshield is provided along its edges with a band of enamel, with a bands of enamel (M1, M2) in respectively the lower edge and the upper edge of the windshield, the enamel bands (M1, M2) has each an inner edge (N1,N2) being in contact with a zone free of enamel,
  a virtual horizontal line (Z1,Z2) respectively parallel to the lower and upper band of enamel (M1, M2) being distant from the inner edges (N1, N2) of the enamel (M1, M2) by a distant Y equal to 50 mm,
  vertical course (C) from the upper edge and the lower edge and passing through the HUD region,
  a virtual point P1 taken at the intersection between the horizontal virtual line and the vertical course
  a virtual point P2 taken at the intersection between the horizontal virtual line and the vertical course,
  the virtual points P1 and P2 being separated by a virtual vertical line d along the vertical course in the zone free of enamel along the vertical course,
  the thickness of the interlayer has a wedge angle ($\alpha$) increasing monotonically in the vertical course (c) between the virtual points P1 and P2 with thickness at P2 point higher than the thickness at P1 point, wherein the intermediate layer along the windshield has a minimum thickness of 900 µm between P1 and P2 in the zone free of enamel area along the vertical course, wherein the thickness profile of the intermediate interlayer in the vertical course is defined by a series of n values (V) defined by a position (d(n)) and a thickness (Tk(n)) measured from the virtual points P1 to P2 along the virtual line d separating the points P1 and P2, to compute the surface area (S).

According to the present invention, the calculated surface area (S) is surrounded by a straight line connecting the first value V1 defined by a position (d(1)) and a thickness (Tk(1)) of the virtual point P1 and the last value V2 defined by a position (d(2)) and a thickness (Tk(2)) of the virtual point P2 and the thickness profile defined by a series of n values (V) mentioned previously, and is above 10.000 mm×μm.

The laminated glazing for a head-up display (HUD) according to the invention wherein the wedge angle(a) defined by P1 and P2 is between 0.05 mrad and 0.5 mrad.

The laminated glazing according to the invention for a head-up display (HUD) has an upper edge and a lower edge. The term "upper edge" refers to that side edge of the laminated glass that is intended to point upward in the installed position. "Lower edge" refers to that side edge that is intended to point downward in the installed position. If the laminated glass is the windshield of a motor vehicle, the upper edge is frequently referred to as the "roof edge" and the lower edge as the "engine edge".

The laminated glazing according to the invention comprises an outer pane and an inner pane that are bonded to one another via a thermoplastic intermediate layer. The laminated glazing is intended, in an opening, in particular a window opening of a motor vehicle, to separate the interior from the external environment. In the context of the invention, "inner pane" refers to the pane of the laminated pane facing the interior (motor vehicle interior). "Outer pane" refers to the pane facing the external environment.

The thickness of the intermediate layer is variable, at least in sections, in the vertical course between the lower edge and the upper edge of the laminated glass with a maximum wedge angle α less than or equal to 0.5 mrad and more preferably less than or equal to 0.4 mrad. The wedge angle has, however, at least in sections, a finite wedge angle, in other words, a wedge angle greater than 0°. Here, the term "in sections" means that the vertical course between the lower edge and the upper edge has at least one section in which the thickness of the intermediate layer varies depending on position. The thickness can, however, also change in a plurality of sections or in the entire vertical course.

The term "vertical course" refers to the course between the upper edge and the lower edge with the direction of the course being substantially perpendicular to the upper edge. Since, in windshields, the upper edge can deviate greatly from a straight line, the vertical course in the context of the invention is more precisely expressed as perpendicular to the connecting line between the corners of the upper edge.

"Wedge angle" refers to the angle between the two surfaces of the intermediate layer. If the wedge angle is not constant, the tangents to its surfaces must be used for its measurement at a point.

Classically, the edges of the windshield are provided with enamel bands to mask and/or protect form UV the electrical connection or element glued on the windshield. The width of the enamel band is generally determined by the car manufacturer and the items to be hidden/protected by the enamel. The enamel bands located on the upper and bottom edges of the windshield have two opposite sides one in contact with the edge (upper or bottom) edge of the windshield and one in contact with the zone free of enamel (F).

According to one embodiment of the present invention, the edges of the windshield are provided with a thermoplastic interlayer having a transmission to the light lower than 5% to mask and/or protect form UV the electrical connection or element glued on the windshield. The thermoplastic interlayer may be a black PVB printed or tinted in the bulb. The width of the "black band" formed by the thermoplastic interlayer is generally determined by the car manufacturer and the items to be hidden/protected by the "black" interlayer. The "black" interlayer located on the upper and bottom edges of the windshield have two opposite sides one in contact with the edge (upper or bottom) edge of the windshield and one in contact with the zone free of "black" interlayer(F).

Thus, the present invention proposes a way to prevent insufficient de-airing during the lamination process by increasing the minimum thickness so as to fill in any gap that bent glass has. The intermediate thermoplastic interlayer and more particularly the PVB is thick and soft enough to fill all the space and ensure good level of de-airing performance.

By defining how steep the concave shape, with parameter (S), the present invention shows surprisingly how the relationship between thickness profile and thickness allows to solve the above cited issues.

The advantage of the invention resides in the fact that when using the interlayer as described above the formation of bubble inside the laminated glass is limited even eliminated. Thus, the time life of the laminated glass is increased and ghost images are avoided.

According to one embodiment of the present invention, the laminated glazing for a head-up display (HUD) is a vehicle windshield (in particular of a motor vehicle, for example, of an automobile) on which an virtual image from a projector is projected. As customary with HUDs, the projector irradiates a region of the windshield, where the radiation is reflected in the direction of the observer (driver), by which means a virtual image is generated, which the observer perceives from his viewpoint as behind the windshield. The region of the windshield which can be irradiated by the projector is referred to as the HUD region. The projector is aimed at the HUD region. The direction of irradiation of the projector can typically be varied by mirrors, in particular vertically, in order to adapt the projection to the body size of the observer. The region in which the eyes of the observer must be situated with a given mirror position is referred to as the eyebox window. This eyebox window can be shifted vertically by adjustment of the mirrors, with the entire area thus available (i.e., the overlay of all possible eyebox windows) referred to as the eyebox. An observer situated within the eyebox can perceive the virtual image. This, of course, means that the eyes of the observer must be situated within the eyebox not, for example, the entire body.

The beam that runs between the projector and the center of the eyebox is commonly referred to as the central beam. It is a characteristic reference beam for the design of an HUD projection arrangement.

According to the present invention, the intermediate layer has a thickness higher than 900 μm, preferably 1000 um and more preferably 1100 um along every thickness in vertical course (C). The intermediate layer has a thickness preferably smaller than 2000 um, preferably smaller than 1800 um and more preferably smaller than 1400 um in vertical course (C). In more preferably embodiment, the intermediate layer has a thickness comprised between 1100 μm and 1400 μm. In that range of thickness comprised between 1100 μm and 1400 μm, the de-airing is improved. With a thickness thinner than 1100 um, the surface roughness of the interlayer facing with inner or outer glass, so-called emboss, is too small that it will be difficult to completely remove the air trapped between interlayer and glass sheets, which will result in bubbling. With a thickness higher that 1400 µm, total thickness of the glass is too thick that optimal wedge angle would be different from the targeted one, which may result in HUD image ghosting. The intermediate layer has, at least in sections, a finite wedge angle, i.e., a wedge angle greater than 0°, namely, in the section in which the thickness is variable.

The term "wedge angle" refers to the angle between the two surfaces of the intermediate layer. If the wedge angle is not constant, the tangents to its surface must be used for its measurement at a point.

The wedge angle is variable at least in the HUD region. Preferably, the thickness and wedge angle increase monotonically in the vertical course from the lower edge of the HUD region to the upper edge of the HUD region.

The invention is based on the finding that the undesirable effect of the formation of bubbles inside the windshield and its amplification by the variable wedge angle are decisively associated with the thickness of the interlayer. The use of a thicker interlayer having the properties cited above allows to reduce significantly the formation of bubbles during the de-airing process of the lamination of the windshield.

Thus, the thicker interlayer can compensate the gap between the glass panes when the glasses are bent. The interlayer thus may flow between the gap potentially present between the bent glass panes.

The HUD viewing field is the zone of the windshield wherein images are projected by the projector unit of the HUD. The position and size of HUD viewing fields will of course vary according to the vehicle and consequently according to the windshield model.

The (variable) wedge angle is, in the HUD region, preferably from 0.05 mrad to 0.5 mrad, particularly preferably from 0.1 mrad to 0.4 mrad. Thus, in typical head-up displays, good results in terms of ghost image suppression are obtained.

The outer pane and the inner pane preferably contain glass, in particular soda lime glass. However, the panes can, in principle, also contain other types of glass, such as quartz glass or borosilicate glass, or even or rigid clear plastics, in particular polycarbonate or polymethyl methacrylate. The thickness of the outer pane and of the inner pane can vary widely. Advantageously, the individual panes have, in each case, a thickness that is a maximum of 5 mm, preferably a maximum of 3 mm. Preferably panes with a thickness in the range from 0.8 mm to 5 mm, preferably from 1.4 mm to 2.5 mm, are used, for example, those with the standard thicknesses 1.6 mm or 2.1 mm.

The thermoplastic intermediate layer contains at least a thermoplastic polymer, preferably ethylene vinyl acetate (EVA), polyvinyl butyral (PVB), or polyurethane (PU) or mixtures or copolymers or derivatives thereof, particularly preferably PVB. According to the present invention, the minimum thickness of the thermoplastic bonding interlayer is 900 µm, particularly preferably from 900 µm, preferably above than 1000 µm and more preferably above than 1100 µm. "Minimum thickness" refers to the thickness at the thinnest point in the vertical course (C) of the intermediate layer. The thermoplastic intermediate layer is formed by at least one thermoplastic bonding interlayer with a variable thickness, a so-called "wedge interlayer" with a variable wedge angle at least in sections.

The thickness of the intermediate layer can be constant in horizontal sections (i.e., sections roughly parallel to the upper edge and the lower edge). In that case, the thickness profile is constant over the width of the laminated glass. However, the thickness can also be variable in horizontal sections. In that case, the thickness is variable not only in the vertical but also in the horizontal course. The intermediate layer can be implemented by a single interlayer or even by more than one interlayer. In the latter case, at least one of the interlayers must be implemented with the wedge angle. The intermediate layer can also be implemented as a so-called "acoustic interlayer", which has a noise-damping effect, or contain such a interlayer. Such interlayers typically consist of at least three layers, with the middle layer having higher plasticity or lower elasticity than the outer layers surrounding it, for example, as a result of a higher plasticizer content. The intermediate layer can have two or more lower elastic layer that demonstrates mentioned noise-damping effect. While increased number of such layer can bring a better acoustic performance, the probability of bubbling is also increased. The benefit of having intermediate layer thicker than 900 µm gets more obvious when it has two or more lower elastic layer.

The outer pane, the inner pane, and the thermoplastic intermediate layer can be clear and colorless, but also tinted or colored. In a preferred embodiment, the total transmittance through the laminated glass is greater than 70%. The term "total transmittance" is based on the process for testing the light permeability of motor vehicle windows specified by ECE-R 43.

The windshield according to the invention can have a functional coating, for example, an IR reflecting or absorbing coating, a UV reflecting or absorbing coating, a low emissivity coating, a heatable coating. The functional coating can be arranged on the outer pane or on the inner pane. The functional coating is preferably arranged on the surface of the pane facing the thermoplastic intermediate layer, where it is protected against corrosion and damage. The functional coating can also be arranged on an insertion film in the intermediate layer, made, for example, of polyethylene terephthalate (PET).

The invention is further accomplished by a method for producing a laminated glass for a head-up display with an upper edge and a lower edge, wherein a) a thermoplastic intermediate layer is provided, whose thickness in the course between two opposing edges (namely those that are provided as the lower edge and the upper edge) is variable at least in sections as described for example in the published patent application WO2017/153167 b) one or multiple interlayers mentioned in step a) with a maximum wedge angle α less than or equal to 0.4 mrad and minimum thickness of 900 um;

c) the intermediate layer(s) is arranged between an outer pane made of glass and an inner pane made of glass with a thickness less than 2 mm, wherein said edges (between which the thickness is variable) are oriented facing the upper edge and lower edge;

d) the inner pane and the outer pane are bonded to one another by lamination.

The preferred embodiments described above with reference to the laminated glazing apply mutatis mutandis to the method according to the invention.

The thermoplastic intermediate layer is provided as a interlayer. In a preferred embodiment, this is a conventional thermoplastic interlayer, in particular PVB interlayer, having (in the initial state) substantially constant thickness, more particularly a wedge-acoustic interlayer. The variable thickness with the wedge angle according to the invention is introduced by stretching the interlayer, in other words, the action of mechanical force through appropriate pulling. The small wedge angles according to the invention can be obtained by stretching, which is significantly more economical than production of the wedge interlayer by extrusion. Alternatively, the thermoplastic intermediate layer can also be produced by extrusion using a wedge-shaped extrusion die.

If the laminated glazing is to be bent, the outer pane and the inner pane are preferably subjected to a bending process before lamination. Preferably, the outer pane and the inner pane are bent congruently together (i.e., at the same time and by the same tool), since, thus, the shape of the panes for the subsequently occurring lamination is optimally matched. Typical temperatures for glass bending processes are, for example, 500° C. to 700° C.

The thermoplastic intermediate layer is provided as a interlayer. The wedge angle can be introduced into the interlayer by stretching a interlayer having (in the initial state) substantially constant thickness or by extrusion using a wedge-shaped extrusion die.

Before lamination, the outer pane and the inner pane are below subjected to a bending process corresponding to the calculated curvature profile. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

The production of the laminated glazing is done by lamination with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

Then, the windshield and the projector are arranged relative to one another, typically by installation of the windshield and the projector in the vehicle body. Thus, the projection arrangement according to the invention is created.

The invention includes, moreover, the use of the projection arrangement according to the invention in a vehicle as a head-up display (HUD), preferably in a motor vehicle, particularly preferably in an automobile.

The invention further includes the use of a laminated glazing according to the invention in a motor vehicle, preferably a passenger car, as a windshield, which serves as a projection surface of a head-up display.

Figure 3:
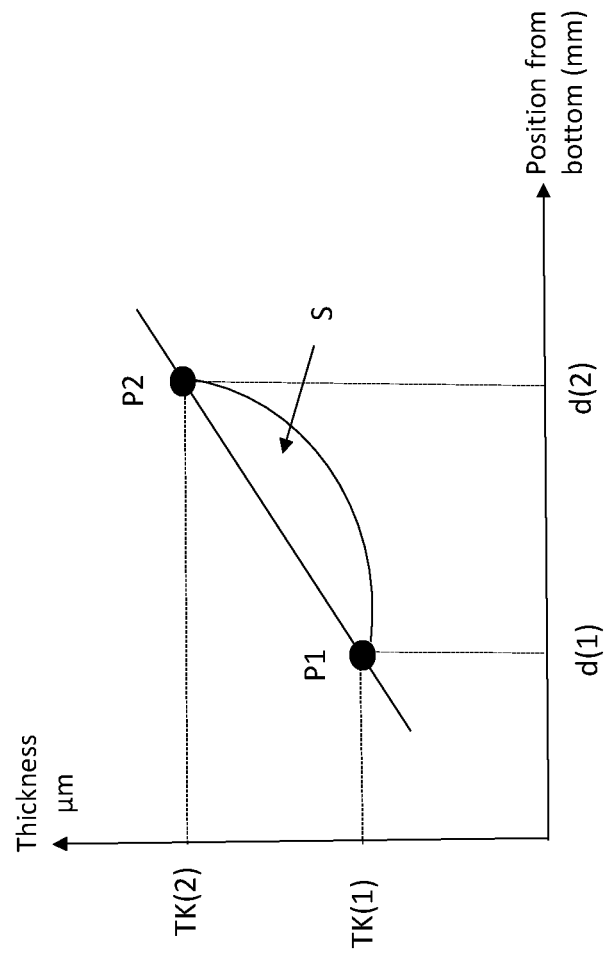
Figure 2:
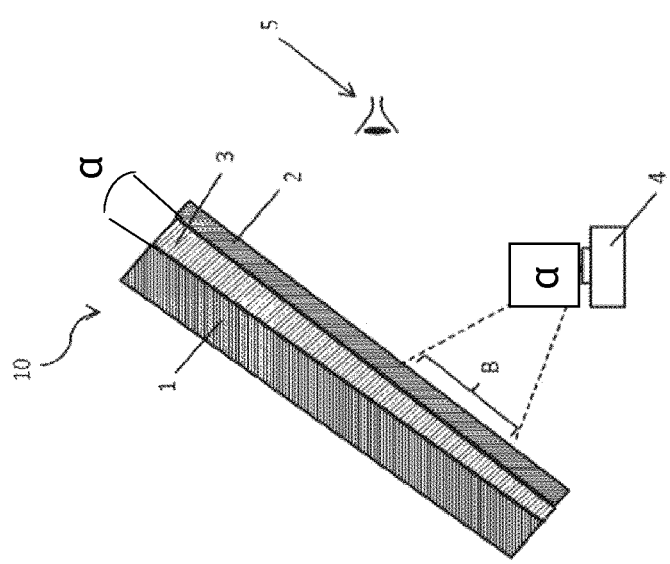

In the following, the invention is explained in detail with reference to drawings and exemplary embodiments. The drawings are schematic representations and are not true to scale. The drawings in no way restrict the invention. They depict:

FIG. 1 a plan view of an embodiment of the laminated glazing according to the invention, FIG. 2 a cross-section through the laminated glazing of FIG. 1, FIG. 3 describes the surface area (S) according the present invention and FIG. 1 and FIG. 2 depict in each case a detail of a laminated glazing 10 according to the invention, which comprises an outer pane 1 and an inner pane 2 that are bonded to one another via a thermoplastic intermediate layer 3. The laminated glazing is provided as a windshield of a motor vehicle that is equipped with a head-up display. In the installed position, the outer pane 1 is turned toward the external environment; the inner pane 2, toward the vehicle interior. The upper edge U of the laminated glazing points, in the installed position, upward toward the vehicle roof (roof edge); the lower edge L, downward toward the engine compartment (engine edge).

The outer pane 1 is made of soda lime glass with a thickness of 2.1 mm or less. The inner pane 2 is likewise made of soda lime glass and has a thickness of 1.6 mm or less. The thickness of panes may be typically in the range from 1.8 mm to 2.6 mm, in the case of windshields, customarily, 2.1 mm.

The thickness of the intermediate layer 3 increases steadily in the vertical course from the lower edge L to the upper edge U. For the sake of clarity, the thickness has a non-linear thickness profile. The intermediate layer 3 is implemented as a wedge-acoustic (commonly 3 interlayers, however it could be more) interlayer made of PVB. In the initial state, the interlayer was a PVB interlayer with the standard thickness of 0.38, 0.51 or 0.63 mm. In particular, intermediate layer can consist of more than two interlayer with at least one of them can be stretched to create wedge angle. Initial thickness of the single interlayer can be 0.05, 0.1, 0.25, 0.38, 0.5, 0.63, 0.76, 0.81 or 1.05 mm. Two, three or more sheets can be selected to create a desired wedge angle. The thickness increase was introduced into the interlayer by stretching, i.e., pulling on the lower edge L. The wedge angle α is roughly 0.2 to 0.4 mrad. Wedge angles of prior art compound glazings for HUDs are in the range around 0.5 mrad.

An example of a stretching method is described in the published patent application in WO2017153167.

In the FIG. 1, a region F, which corresponds to a zone free of enamel F. The enamel M is classically provided along the edges (lateral and transverse) of the windshield is also indicated and can extend to the camera zone. The enamel M1 provided in the lower edge L of the windshield 10 has an exterior edge towards the lower edge of the windshield 10 and an inner edge N1 in contact with the zone free of enamel F. The enamel M2 provided in the upper edge U of the windshield 10 has an exterior edge towards the upper edge U of the windshield 10 and an inner edge N2 in contact with the zone free of enamel F.

A virtual horizontal line Z1 distant by 50 mm from the inner edge N1 of the enamel band M1 and another virtual horizontal line Z2 distant by 50 mm from the inner edge N2 of the enamel band M2 are shown in FIG. 1.

A "vertical course" C referring to the course between the upper edge U and the lower edge L with the direction of the course being substantially perpendicular to the upper edge U. Since, in windshields, the upper edge U can deviate greatly from a straight line, the vertical course C in the context of the invention is more precisely expressed as perpendicular to the connecting line between the corners of the upper edge U. The vertical course C passes through the HUD region H.

A virtual Point P1 having a value of thickness TK1 and a position D1 and a virtual Point P2 having a value of thickness TK2 and a position D2 are shown in FIG. 1. The virtual Point P1 and P2 are from a series of n values measured along the vertical course. The point P1 is positioned at the intersection between the virtual horizontal line Z1 and the vertical course C. The point P2 is positioned at the intersection between the virtual horizontal line Z2 and the vertical course C. The points P1 and P2 are separated by a virtual vertical line d.

Along the virtual vertical line d separating the Points P1 and P2, n values of thickness and position in the windshield have been measured to compute the surface area (S).

As shown in FIG. 3, the measured values have been reported in a graph with in X axis the position d of the point measured in the zone free of enamel F between the horizontal lines Z1 and Z2 along the vertical course (C). The position d is measured from, and in the Y axis the thickness of the interlayer, and more particularly the thermoplastic interlayer, for each point measured. The first value V1 defined by a position(d(1)) and a thickness (Tk(1)) of the virtual point P1, P1 is taken at a distance Y of 50 mm from the inner edge N' of the enamel M' located in the lower part L of the windshield along the virtual line Z1, and the last value V2 defined by a position (d(2)) and a thickness (Tk(2)) of the virtual point P2, P2 is taken at a distance Y of 50 mm from the inner edge N" of the enamel M" located in the upper part U of the windshield along the virtual line Z2, and the thickness profile defined by a series of n values (V) mentioned previously. According to this embodiment, the virtual points P1 and P2 are separated by a distance d along the vertical course (C).

A straight line connecting the coordinates of the point P1 and the coordinates of the point P2 is drawn.

According to the present invention, the surface area S surrounded by the straight line connecting the points P1 and P2 and series of thickness values measured in each position is above 10.000 mm×µm as shown in FIG. 3.

According to the present invention, the thickness of the thermoplastic intermediate interlayer is more than 900 µm and preferably more than 1000 µm and more preferably than 1100 um along every thickness in vertical course (C). The intermediate layer has a thickness preferably smaller than 2000 um, preferably smaller than 1800 um and more preferably smaller than 1400 um. In more preferably embodiment, the intermediate layer has a thickness comprised between 1100 um and 1400 um.

Thus, thanks to the profile of the thickness according to the present invention, the formation of bubbles during the lamination process is avoided. According to the present invention, the intermediate interlayer is a wedge-acoustic interlayer made of several layers of thermoplastic interlayers.

In the figures, a region H, which corresponds to the HUD region of the laminated glazing, is also indicated. In this region, images are to be produced by an HUD projector 4. By means of the wedge-shaped 3 configuration of the intermediate layer, the two images that are produced by reflection of the projector image on the two surfaces of the outer pane 1 and of the inner pane 2 facing away from the intermediate layer 3 coincide with one another. Consequently, distracting ghost images arise to a small extent.

According to the present invention, the thermoplastic intermediate layer is a wedge-acoustic interlayer. Such as wedge-acoustic interlayer is described in the patent EP1800855 or WO2017/204121.

Indeed, the present invention is particularly suitable when the thermoplastic interlayer is a wedge acoustic interlayer because more bubbling occurs during the lamination process.

FIG. 2 depicts the laminated glazing 10 of FIG. 1 as part of a projection arrangement for an HUD. The arrangement comprises, besides the laminated glazing 10, a projector 4, which is aimed at a region H. In the region H (HUD region), images can be produced by the projector that are perceived by the observer 5 (motor vehicle driver) as virtual images on the side of the laminated glazing 10 turned away from him. The wedge angle (a) in the region H results in surfaces of the outer pane 1 and of the inner pane 2 inclined relative to one another, by which means ghost images can be prevented.

According to one embodiment of the present invention, the laminated glazing is formed by an outer pane 1 that is thicker than the inner pane 2.

According to one embodiment of the present invention, the laminated glazing has a minimum radius of bent glass is less than 1000 mm.

According to one embodiment of the present invention, the laminated glazing is a windshield on which a head-up display image is projected and interlayer thickness profile created a wedge angle larger than 0.2 mrad in the projected area H.

According to one embodiment of the present invention, the thermoplastic interlayer (3) is made by at least a first, a second and a third interlayers. The first, second and third interlayers are stretched with a constant thickness creating a first, a second and a third wedge angle.

The first, second and the third interlayers are stacked together to make the thickness greater than 900 um with a wedge angle resulting of the first, second and third angles.

The stacked interlayer are provided between two bent glass sheets and assembled by de-airing and autoclave process to form a HUD-acoustic windshield.

According to one embodiment of the present invention, the acoustic layer is stretched. The thickness of acoustic, core layer at the upper edge at the point P2 is thicker by 10% compared with the lower edge at the point P1.

Thus, less bubbles are obtained during the lamination process of the glass sheets to form the windshield, by reducing the thickness of the core layer.

In an advantageous implementation, the method according to the invention comprises a step of laminating transparent layers, said transparent layers comprising said wedge layer.

In an advantageous implementation, the wedge layer is a PVB layer.

| List of Reference Characters: | |
| --- | --- |
| REF# | Feature |
| (10) | Windshield |
| (1) | Outer pane |
| (2) | Inner pane |
| (3) | Thermoplastic intermediate layer |
| (4) | Projector |
| (5) | Observer/vehicle driver |
| (U) | Upper edge of the windshield 1 |
| (L) | Lower edge of the windshield 1 |
| (H) | region of the laminated glazing/HUD region |
| M | enamel |
| M1 | enamel provided on the lower edge of the windshield 10 |
| M1 | enamel provided on the lower edge of the windshield 10 |
| M2 | enamel provided on the upper edge of the windshield 10 |
| N1 | Inner edge of the lower edge of enamel M1 provided on the windshield 10 |
| N2 | Inner edge of the upper edge of enamel M2 provided on the windshield 10 |
| Z1 | Virtual horizontal line distant from the inner edge N1 of the enamel M1 of 50 mm |
| Z2 | Virtual horizontal line distant from the inner edge N2 of the enamel M2 of 50 mm |
| Y | Distance between M' and a virtual line with a maximum of 50 mm |
| α | Wedge angle of the intermediated layer 3 |
| C | Vertical course between the upper edge U and the lower edge L |
| F | Free zone of enamel |
| P1 | Virtual point at the intersection of Z1 line and vertical course C |
| P1 | Virtual point at the intersection of Z2 line and vertical course C |
| d | Virtual vertical line between P1 and P2 |

The invention claimed is:

1. A laminated glazing for a head-up display (HUD), comprising:

an outer pane and an inner pane, which are bonded to one another via a thermoplastic intermediate layer, the laminated glazing having an upper edge (U) and a lower edge (L), a HUD region (H) wherein a virtual image is generated by a HUD-projector, wherein the laminated windshield is provided along its edges with a band of enamel (M), with bands of enamel (M1, M2) respectively in the lower edge (L) and the upper edge (U) of the laminated windshield, the enamel band (M1, M2) has each an inner edge (N1,N2) being in contact with a zone free of enamel (F), a virtual horizontal line (Z1,Z2) respectively parallel to the lower and upper band of enamel (M1, M2) being distant from the inner edges (N1, N2) of the enamel (M1, M2) by a distance Y equal to 50 mm, vertical course (C) from the upper edge (U) and the lower edge (L) and passing through the HUD region (H), a virtual point P1 taken at the intersection between the horizontal virtual line (Z1) and the vertical course (C)

a virtual point P2 taken at the intersection between the horizontal virtual line (Z2) and the vertical course (C), the virtual points P1 and P2 are separated by a virtual vertical line (d) along the vertical course (c) in the zone free of enamel (F), a thickness of the interlayer has a wedge angle (a) increasing monotonically in the vertical course (c) between the virtual points P1 and P2 with a thickness at P2 point higher than a thickness at P1 point, wherein the intermediate layer along the laminated windshield has a minimum thickness of 900 μm between P1 and P2 in the zone free of enamel (F) area along the vertical course (c), the thickness profile of the intermediate layer in the vertical course (C) is defined by a series of n values (V) defined by a position (d(n)) and a thickness (Tk(n)) measured from the virtual points P1 to P2 along the virtual line (d) separating the points P1 and P2, to compute a surface area(S), and wherein the calculated surface area (S) is surrounded by a straight line connecting a first value V1 defined by a position (d(1)) and a thickness (Tk(1)) of the virtual point P1 and a last value V2 defined by a position (d(2)) and a thickness (Tk(2)) of the virtual point P2 and the thickness profile defined by the series of n values (V), and is above 10.000 mm×μm.

2. The laminated glazing according to claim 1, wherein the laminated glazing is a motor vehicle windshield.

3. The laminated glazing according to claim 1, wherein the wedge angle (α) defined by P1 and P2 is between 0.05 mrad and 0.5 mrad.

4. The laminated glazing according to claim 1, wherein the outer pane and the inner pane contain soda lime glass and have a thickness from 0.8 mm to 5 mm, and wherein the intermediate layer contains at least polyvinyl butyral (PVB), ethylene vinyl acetate (EVA), polyurethane (PU), or mixtures, copolymers or derivatives thereof.

5. The laminated glazing according to claim 4, wherein the outer pane and the inner pane have a thickness from 1.4 mm to 2.5 mm.

6. The laminated glazing according to claim 4, wherein the intermediate layer contains PVB.

7. The laminated glazing according to claim 1, wherein the intermediate layer is implemented as a noise-damping, multilayer interlayer.

8. The laminated glazing according to claim 7, wherein there are two or more noise-damping layers.

9. The laminated glazing according to claim 7, wherein the thickness of the noise-damping layer has a different thickness in a lower bottom and an upper bottom by 10%.

10. The laminated glazing according to claim 1, wherein the outer pane is thicker than the inner pane.

11. The laminated glazing according to claim 1, wherein the laminated glazing has a minimum radius of bent glass of less than 1000 mm.

12. The laminated glazing according to claim 1, wherein the laminated glazing is a windshield on which a head-up display image is projected and an interlayer thickness profile creates a wedge angle larger than 0.2 mrad in the HUD region (H).

13. A method for producing a laminated glazing according to claim 1, comprising:
   a) providing a thermoplastic intermediate layer, with a thickness in a course between two opposing edges (namely those that are provided as the lower edge and the upper edge) is variable at least in sections, with a maximum wedge angle α less than or equal to 0.4 mrad and minimum thickness of 900 um;
   b) arranging the intermediate layer between an outer pane made of glass and an inner pane made of glass with a thickness less than 2 mm, wherein said edges are oriented facing the upper edge and lower edge; and
   c) bonding the inner pane and the outer pane to one another by lamination.

* * * * *